US011269664B2

(12) United States Patent
Balz (10) Patent No.: US 11,269,664 B2
(45) Date of Patent: Mar. 8, 2022

(54) SYSTEM, METHOD AND APPARATUS FOR PROVIDING A TOGGLEABLE REMOTING MODE FOR COMPUTER OPERATING SYSTEMS

(71) Applicant: Christopher Balz, Palo Alto, CA (US)

(72) Inventor: Christopher Balz, Palo Alto, CA (US)

( * ) Notice: Subject to any disclaimer, the term of this patent is extended or adjusted under 35 U.S.C. 154(b) by 963 days.

(21) Appl. No.: 15/267,098

(22) Filed: Sep. 15, 2016

(65) Prior Publication Data
US 2017/0075702 A1    Mar. 16, 2017

Related U.S. Application Data

(60) Provisional application No. 62/219,023, filed on Sep. 15, 2015.

(51) Int. Cl.
*G06F 9/451* (2018.01)
*G06F 9/48* (2006.01)

(52) U.S. Cl.
CPC ............ *G06F 9/452* (2018.02); *G06F 9/4881* (2013.01)

(58) Field of Classification Search
USPC ......................................................... 709/228
See application file for complete search history.

(56) References Cited

U.S. PATENT DOCUMENTS

| | | | | |
|---|---|---|---|---|
| 2006/0218285 | A1* | 9/2006 | Talwar | G06F 9/5072 709/227 |
| 2011/0270991 | A1* | 11/2011 | Zawacki | H04L 67/04 709/227 |
| 2012/0324365 | A1* | 12/2012 | Momchilov | H04L 67/42 715/738 |
| 2013/0067100 | A1* | 3/2013 | Kuzin | H04L 67/08 709/228 |
| 2014/0258877 | A1* | 9/2014 | Balz | G06F 3/0481 715/740 |
| 2015/0113157 | A1* | 4/2015 | Chan | G06Q 10/06 709/231 |

* cited by examiner

*Primary Examiner* — Hermon Asres
(74) *Attorney, Agent, or Firm* — Bryan Fibel (57) ABSTRACT

Software can also be used via a remote application window, remote desktop window, or remote graphical windowing user session window. The present invention describes how software (application, desktop, or graphical windowing user session) can know whether or not it is running in local or remote mode, and control its handling of functionalities accordingly. The software does this by checking a variable set in the windowing session by the operating system. System, method, and apparatus for providing a toggleable remoting mode for computer operating systems is provided. The invention provides for dynamically setting an environment variable, that evaluates in a conditional statement, in the operating system process of a current windowing display session hosted by the operating system, upon request from a remote user to initiate a remote graphical windowing user session, a remote computer desktop, or a remote graphical application window, directing a software application to consult the variable to determine if the operating system is being used via a remote window or not, and if the environment variable evaluates to true or not, respectively, performing a functionality differently.

12 Claims, 4 Drawing Sheets

SYSTEM, METHOD AND APPARATUS FOR PROVIDING A TOGGLEABLE REMOTING MODE FOR COMPUTER OPERATING SYSTEMS

CROSS REFERENCE TO RELATED APPLICATIONS

This application claims priority from a provisional U.S. patent application Ser. No. 62/219,023 filed on Sep. 15, 2015.

FIELD OF THE INVENTION

Embodiments of the invention generally relate to providing remoting services (including remote desktop environments, remote desktop application windows, or remote graphical windowing user sessions), from a computer, to one or more other computers. Specifically, embodiments of the invention relate to software applications running on computers where a single computer may provide both remoting services and local operation of the same software application build.

BACKGROUND

Software is often used by a local user sitting in front of a computer or holding a mobile device. Computer software can also be used via a remote application window, remote desktop window, or remote graphical windowing user session window. This includes software on mobile devices as well.

Performing navigational action on links within a remote/virtual window traditionally results in successively nested remote/virtual windows. Links can be specially marked so as to be recognizable by the remote machine as pop-out links. The software can be modified so that when navigational action occurs on a link marked as a pop-out link, the nesting problem is avoided by refreshing the session with the content at the inner window, so that it is now the outermost window. However, when the computer software is not being used via a remote application window, remote desktop window, or remote graphical windowing user session window, links marked as pop-out links should not be treated as pop-out links, as there is no remote window to be refreshed.

Additionally, remote windowing sessions, especially those carried out over the Internet, face much greater latency than local windowing sessions. This latency can result in significant degradation of the end user's experience, especially in graphics support. For example, it can cause the pointing device pointer to freeze whilst the end user is still attempting to move the pointing device. Further, when content is streamed in a remote windowing session, such as when the end user is watching a video or movie from a source that is not resident on the remoting server, that streaming content must be drawn twice: It is rendered once on the remoting server, and once on the end user's device.

A need exists to identify if a computer's software is being run remotely or locally.

SUMMARY

Software is often used by a local user sitting in front of a computer or holding a mobile device. Software can also be used via a remote application window, remote desktop window, or remote graphical windowing user session window. The present invention describes how software (application, desktop, or graphical windowing user session) can know whether or not it is running in local or remote mode, and control its handling of functionalities accordingly. The software does this by checking a variable set in the windowing session by the operating system. This is useful for the determination of how to handle pop-out links in order to avoid unnecessary nesting of remote/virtual windows, imposes significant burdens upon the producer of the software, the physical resources of a computer that can be used in both remote and local modes, and upon the administrators of said computer. If the variable is present and has a value of boolean 'true', then the software treats pop-out links specially. If it is not either present or evaluates in a conditional statement to the boolean value 'false', then the software treats pop-out links as regular links. This avoids the need to produce separate builds, executables, and installation packages, and supporting the same. Additionally, the invention offers the operating system the opportunity to optimize system operations to reduce the inherently greater latency of remote windowing sessions and to improve streaming of content.

System, method, and apparatus for providing a toggleable remoting mode for computer operating systems is provided. The invention provides for dynamically setting an environment variable, that evaluates in a conditional statement, in the operating system process of a current windowing display session hosted by the operating system, upon request from a remote user to initiate a remote graphical windowing user session, a remote computer desktop, or a remote graphical application window, directing a software application to consult the variable to determine if the operating system is being used via a remote window or not, and if the environment variable evaluates to true or not, respectively, performing a functionality differently. The environment variable can be a new custom variable or a preexisting variable.

If the environment variable indicates remote mode, the functionality can be to optimize remote windowing sessions by proportionally allocating relatively more memory and/or CPU priority to the graphics operations required by remote windows, to reduce latency in remote windowing sessions. If the environment variable indicates remote mode, the functionality can be, when streaming content to a client, to send the source information to the client and to skip rendering the content on the remoting server. Upon navigational action on a pop-out link, if the environment variable indicates remote mode, the functionality can be to treat the link as a pop-out link

BRIEF DESCRIPTION OF THE DRAWINGS

The accompanying drawings taken in conjunction with the detailed description will assist in making the advantages and aspects of the disclosure more apparent.

DETAILED DESCRIPTION

Reference will now be made in detail to the present embodiments discussed herein, illustrated in the accompanying drawings. The embodiments are described below to explain the disclosed system, apparatus, and method by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate.

The subject matter is presented in the general context of systems and program modules. Those skilled in the art will recognize that other implementations may be performed that may include different data structures, components, or routines that perform similar tasks. The invention can be practiced using various computer system configurations, such as client server systems.

System, apparatus and method for providing a toggleable remoting mode for computer operating systems is provided. This enables a computer and its associated software to be used in both a local and a remote mode with respect to software applications on the system. The invention provides for the ability to identify if the environment is in a remoting session or is being used by a local user. This can be utilized with respect to handling navigational links that may lead, in the remote mode, to undesirable nesting of remote graphical windows (remote graphical user windowing sessions, remote desktops, or remote application windows), so that such undesirable nesting is avoided. Further, other functionalities, such as optimizations to reduce latency in remote windowing sessions and improvement of streaming content playback, can utilize the toggleable remote mode feature.

Figure 1:
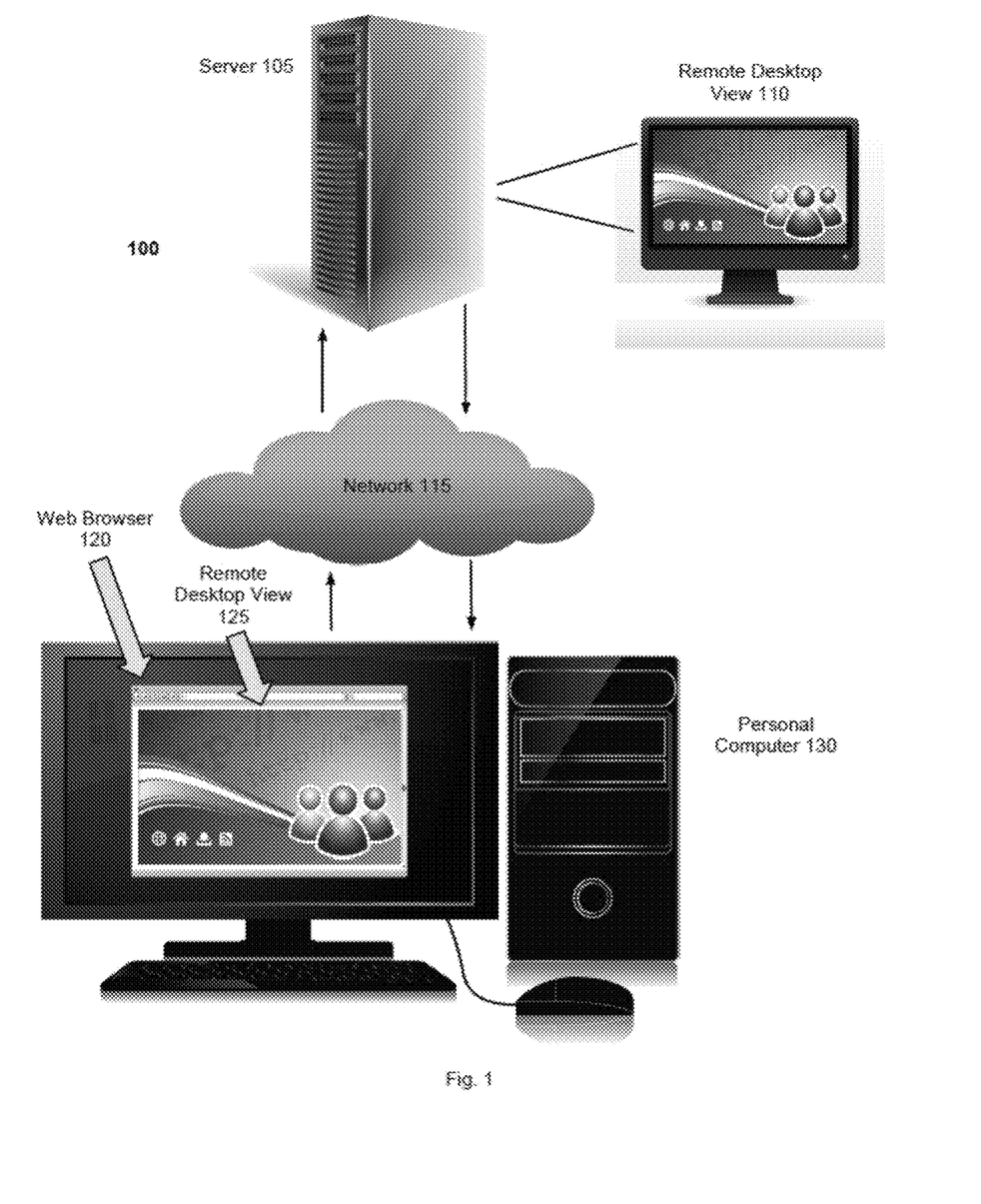
FIG. 1 is a block diagram depicting a remote server, accessible through a network, and providing a view of its graphical desktop to a remote client personal computer on a web browser running on the personal computer.

FIG. 1 is a block diagram depicting a typical client server system 100 where the invention would be used. It consists of a remote server 105, accessible through a network 115 such as the Internet or a local-TCP/IP-based network. The remote server 105 provides a view of its graphical desktop (Remote Desktop View 110, seen for example on the monitor plugged into it in the diagram), although this could equally be a single application window such as would commonly run upon a graphical computer desktop, or in the most general case, a non-application graphical window, such as a Display Manager program that is not, strictly defined, an application, but presents a graphical window to the user for the purpose of logging into the graphical desktop, upon which run applications. The latter represents an example of what is known in the art as a "graphical windowing user session". The client, Personal Computer 130, accesses this Remote Desktop View 110 via Web Browser 120, which shows Remote Desktop View 125. Remote Desktop View 125 shows the exact same content as Remote Desktop View 110, but runs on the client computer (Personal Computer 130), and not on the server computer (Server 105). The user may interact with the application using the mouse and keyboard shown and/or any other input device. Additional usable client devices (equally client devices as Personal Computer 130 is a client device) include, but are not limited to, smartphones, tablets, connected entertainment devices (such as smart tvs), digital media players, and wearable/implants (computing devices integrated with the human body but capable of displaying desktops, application windows, or other graphical windows from remote computers so that the wearer or host individual can interact with the display). Such computer devices may include one or more processors, data storage in the form of memory (hard disk, non-volatile solid state memory, random access memory, cache memory, etc.) or a database, and a computer operating system ("OS").

Software is often used by a local user sitting in front of a computer or holding a mobile device. For the purpose of this invention, the means of access ("user agent") would likely be a web browser, but the user agent can be any software application where a user may encounter a navigational link. When the user clicks on a navigational link, the navigational agent (such as a web browser) of the local computing device (such as a desktop computer, or mobile device) follows the navigational link as is done in the current state of the art. This is termed the "local mode" of operation of the computer. Use by a remote application window is termed the "remote mode" of operation of the computer. Generally, when the computer is being used via a remote application window, navigational action by a user traditionally results in successively nested remote/virtual windows.

Links can be specially marked so as to be recognizable by the remote machine as pop-out links. The software (the OS and/or the userland applications running thereupon) can be modified so that when navigational action occurs on a link marked as a pop-out link, it does not follow pop-out navigational links in the traditional manner, so that the excess nesting problem can be avoided. Instead, the software forwards the navigational link to the viewer used by the user as the display for the remote application window, so that the viewer or a child thereof can be entirely redirected to the resource at the navigational link, thus avoiding the excess nesting problem.

The software applications on an OS must be specially programmed so that they can perform this forwarding in remote mode. If such programs always forwarded the navigational links in question, then such programs would not be properly operable when the OS (including any programs on it) were not being used via a remote window, but instead were being used in local mode. They would not follow the navigational links themselves and would instead attempt to pass navigational control to a non-existent remote windowing session.

Conventionally, a separate application build would be provided for use in remoting scenarios. The separate application build for use in remoting scenarios would run the special code for handling the pop-out links, and the application build that did not run this code would be used for local use scenarios. Such an approach presents the disadvantage of requiring the software producer (as in the software author, authoring company, or software creator) to produce two entirely separate builds and concomitant installation packages (including the executables) of their software: one for the local mode, and one for the remote mode. Additionally, it would require a single computer that could be used by both remote and local users simultaneously to have special code to choose which executable to launch when the user (local or remote) wanted to launch the software.

That means as well that two installations, each containing all the complete artifacts for the software, would need to be resident on such a computer, or that similar schemes be undertaken. The approaches to accomplish this would represent either an inefficient use of storage space (such as non-volatile memory space, as in solid-state or flash memory, or a hard disk) or an inefficient use of compute time. The approach of requiring two complete, nearly duplicate installations of a given application offers a clear example of an inefficient use of storage space.

Possible approaches to the nesting problem include but are not limited to a single build (executing from a single installation) that would be processed at start-time to include pop-out link handling code where necessary, or compilation (pre-run or just-in-time) or interpretation (run-time interpretation, via an interpreter) that would include the required code for handling pop-out links. These similar approaches would use compute time inefficiently compared to the present invention, due to the overhead of this processing. They would impose unnecessary delay from the extra processing steps required that must occur at the very same time that the user would like the software to start up quickly and perform well in terms of speed of execution.

Instead, the present invention enables the software code comprising an application to be either run or not run depending on the current use-case scenario (respectively, remote or local) from a single build, installation, and executable of the given software. Because the invention provides for an environment-level switch for a toggleable remoting mode, software running in the environment can consult the switch in order to determine the appropriate course of action. The software application is coded to perform differently between remote mode and local mode. The invention can not only be used to determine if the pop-out link functionality should be executed but also can be used for other general uses where an application would want to know if it was operating in remote or local mode.

The remoting mode switch enables additional optimization of remote windowing sessions. Remote windowing sessions, especially those carried out over the Internet, face much greater latency than local windowing sessions. This latency can result in significant degradation of the end user's experience, especially in graphics support. For example, it can cause the pointing device (mouse or trackpad) pointer to freeze whilst the end user is still attempting to move it by moving the pointing device.

The optimization can be carried out by allowing OS processes that support the remote windowing session, such as those serving the graphics function, priority over those serving local windowing sessions. This can be done for either or both fast-access memory (such as random-access memory) and CPU priority. An OS can allocate a relatively greater portion of its fast-access memory to processes that support remote windowing sessions, so that latency can be reduced for those sessions. Also, an OS can assign a higher execution priority to processes that support remote windowing sessions, so that the latency is reduced due to the earlier end time of the computational job.

The remoting mode switch can be further used to optimize streaming content, such as video and audio, together or singly. When content is streamed in a remote windowing session, such as when the end user is watching a video or movie from a source that is not resident on the remoting server (such as any of the common video or movie services), that streaming content must be drawn twice: It is rendered once on the remoting server, and once on the end user's device. This is also the case with non-streamed content. However, streamed content from a source not located on the remoting server is typically never modified by the remoting server. So the scenario is one of a simple pass-through requiring a render operation on the remoting server that adds no value to the content. Instead, it would be optimal to only render that content on the client.

As streaming content players for audio and video operate quite reliably across different types of computers and operating systems, an optimization can safely be carried out where the stream is only rendered once on the client. To do this, the client must know the location of where the rendered stream belongs on the screen, it must have a streaming player, and it must know the address of the streaming content. With the toggleable remoting mode, the applications running on the remoting server can know whether to send the source information to the client (the screen coordinates, the streaming location, and type of streamed content) and most importantly whether to skip rendering the content. By the remoting server skipping the rendering of the content, the client is freed of having to constantly process a large amount of incoming data about the changes that occur to the rendered content. The savings is great because almost every pixel of a movie or video changes every moment. Because the client is not thusly loaded down with processing and executing commands from the remoting server for excess screen updates, this allows the client to ensure a very smooth playback experience for the end user.

Toggleable remoting mode may be set via a number of ways, depending on the computer language and OS used by the remoting engine. However, the general approach is to create a new environment variable that indicates boolean 'true' or 'false' in conditional statements, depending on if the windowing session will be in remoting mode or not. Then, in the OS process that spawns the windowing sessions, the environment variable can be set to a value that evaluates in conditional statements to boolean 'true' or another value that evaluates in conditional statements to boolean 'false'. In this scenario, a shell script sets the environment variable first, and then runs (directly, or indirectly) the windowing session and the desktop and/or application(s) requested by the user.

For example, under a Unix-like system, the remoting engine could launch the requested remoting session for a user by executing a specific shell script indicating if the session is a remote one or not. Continuing the example, first the program handling a request to provide a remote graphical windowing session for a user could run the standard X Windows System command 'startx' to initiate the provision of the graphical session. In the case where the windowing session desired is to be run in remoting mode, a shell script, such as the X Windows System standard '~/.xinitrc' on a Unix-like system so equipped, would execute the code, 'export IN_REMOTING_SESSION=true' to set the boolean flag. As indicated by its name, this environment variable provides, in the present example, the information of whether or not the current session is a remote one or not to all graphical applications running in the session.

Here is an example of the '~/.xinitrc' file, set for when the session is in remote mode:

```
export IN_REMOTING_SESSION=true   # Environment variable.
exec openbox &                    # Window Manager.
exec gnome-session                # Desktop.
```

The file is located at the user's home directory, so that is why it is referred to here with the file path prefix, '~/'. The first line of the example file above sets the environment variable 'IN_REMOTING_SESSION'. The remaining lines handle the tasks of providing the user with what could be desired functionality—in this case, a windowing manager and a desktop that both work with the X Windows System. The windowing manager allows the user to move windows around on the desktop, and the desktop provides common utilities such as graphical user interface access to common software applications such as user help for the operating system, a graphical file system browser, word processing program, command terminal, and services such as user logout and software update.

A user logging in directly to the system as a non-remote user could run the session with the 'IN_REMOTING_FLAG' set to 'false' via a simple orchestration approach. For example, there could be three copies of the '~/.xinitrc' file: One named '.xinitrc-remote', one named '.xinitrc-local', and one named '.xinitrc'. For simplicity, they can all be located directly under '~/'. The '.xinitrc' file will be switched to the remote version when a remote session is desired, such as with the following command:

cp ~/.xinitrc-remote ~/.xinitrc

Then when the remote session has ended, it will be switched back to local mode:

cp ~/.xinitrc-local ~/.xinitrc

The script file '~/.xinitrc-local' would, in the current example, look like this, with the two variants described directly below:

```
# Environment variable:
export IN_REMOTING_SESSION=
exec openbox &         # Window Manager.
exec gnome-session     # Desktop.
```

Alternatively, the first two lines in '~/.xinitrc-local', the comment line starting with '#' and the next line, 'export IN_REMOTING_SESSION=' could be omitted entirely.

In the script software code above, the character following the '=' sign is a line break, so that no value (a symbol for undefined) is assigned to IN_REMOTING_SESSION, so that any prior value that it held will be overwritten. This explicitly sets the value of the environment variable to a value that will evaluate to boolean 'false' as conveniently as possible in client code.

In some Unix-like systems, an '.xsession' configuration file can optionally be used in a more advanced configuration than given above, but operating on the same principles, to switch between different configurations for the user's session.

Any graphical applications, such as a word processing system, started in the user session are descendent processes of the X Windows System program, enabling them access to the environment variable IN_REMOTING_SESSION. For example, an Electron App (a graphical application that was developed using the Electron framework for developing applications that run in an X Windows System or other analogous type of windowing environment) can be launched from an X Windows System desktop that has an '.xinitrc' file that sets an environment variable IN_REMOTING_SESSION to 'true'. Then, in a script running at the bottom of the Electron App's 'index.html' file, it can verify (in this case, to the user of the Electron App) the value of the environment variable with the code below:

```
<script>
  (function ( ) {
    var messageContainer = document.getElementById( 'env-var-
      for-toggleable-remoting-mode' );
    var message;
    if ( process.env.IN_REMOTING_SESSION ) {
      message   =   'The application is running in remote mode.'
    } else {
      message   =   'The application is not running in remote
        mode.'
    }
    messageContainer.innerHTML = message;
  })( );
</script>
```

The line 'var messageContainer= . . . ' obtains the user interface container in which a message will be shown to the user that indicates whether the application is running in remote mode or not. The conditional statement 'if(process.env.IN_REMOTING_SESSION) { . . . ', above, allows the appropriate message indicating to the user that the application is running in remote mode or not to be set (in the code above, it is stored in the variable 'message'). The conditional statement is able to do this because the statement 'process.env.IN_REMOTING_SESSION' accesses the operating system environment variable IN_REMOTING_SESSION, if it exists.

The statement 'process.env.IN_REMOTING_SESSION' is able to access the environment variable IN_REMOTING_SESSION, if it exists, because the Electron App graphical application running on the X Windows System (in this example) allows the underlying code, which is a NodeJS program, access to the graphical application environment held by the Electron App. A NodeJS program will have access to the environment variables of the operating system shell that it is running in. Therefore, the code statement 'process.env.IN_REMOTING_SESSION' can be executed without error in the Electron App graphical application running on the X Windows System. Other graphical application development platforms similarly provide their own respective access to the local operating system's process environment variables.

If IN_REMOTING_SESSION does exist, then the conditional statement evaluates to boolean 'true'. If IN_REMOTING_SESSION does not exist, has no defined value, or is of a value that evaluates to boolean 'false', then the conditional statement will evaluate to boolean 'false' and the code path indicated by the 'else' statement will be followed.

Where IN_REMOTING_SESSION has been set to a value that evaluates in a conditional statement to the boolean value 'true' as in the example '~/.xinitrc' above, the user will see the message, "The application is running in remote mode.", displayed by the application logic described above on the application screen. In any case where IN_REMOTING_SESSION has not been set to the boolean value 'true' as in the example '~/.xinitrc' above, the application logic will similarly display the message, "The application is not running in remote mode." to the user on the application screen.

For best practice to avoid any potential problems stemming from conflict with other environment variables, this environment variable's name should be unique in the space of currently loaded standard and common environment variables, which IN_REMOTING_SESSION is so currently, given the state of the art at the time of this writing. Alternatively, in the OS process that spawns the windowing session, an existing environment variable can be set to 'true', a value that evaluates in conditional statements to boolean 'true', or a value that evaluates in conditional statements to boolean 'false' depending on if the windowing session will be in remoting mode or not. With this approach, one must be careful to avoid setting an existing variable to an incorrect value.

Figure 2:
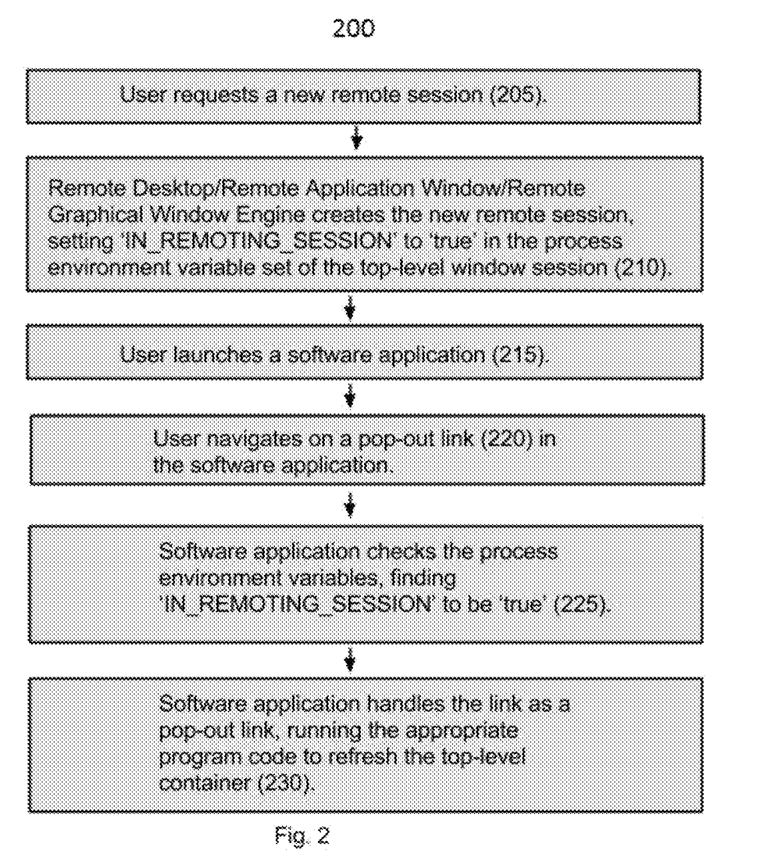
FIG. 2 is a flowchart depicting a use-case scenario where a user, using a remote window, navigates a pop-out link and the pop-out link is handled properly due to the setting of an environment variable, in this case 'IN_REMOTING_SESSION', to 'true'.

FIG. 2 is a flowchart depicting a use-case scenario where a user, using a remote window, navigates a pop-out link and the pop-out link is handled properly because an environment variable, 'IN_REMOTING_SESSION', has been set as described above. Other functionalities can be performed similarly.

The user directs a client program, such as a web browser, to the remote computer, using a specific URL. The remote computer (specifically, the Remote Desktop/Remote Application Window/Remote Graphical Window Engine, referred to below as "the remoting engine") is programmed to recognize that URL as signifying that the local user is requesting a remote session 205 for a specific application (for example, a word processing program).

The remoting engine begins to fulfill that request, and in so doing, sets the environment variable 'IN_REMOTING_SESSION' in the windowing session's top-level system process 210. The user launches a software application 215. The user, upon receiving the remote window containing the software application, clicks on a navigational link in the application that is a pop-out link 220. The software application then checks its process environment variables and finds that 'IN_REMOTING_SESSION' is boolean 'true' 225, and handles the link as a pop-out link by running the appropriate code to refresh the top-level container 230. This results in a directive being sent to the client web browser to reload the web browser's top level container with the content provided at the pop-out link's destination URL or URI.

Figure 3:
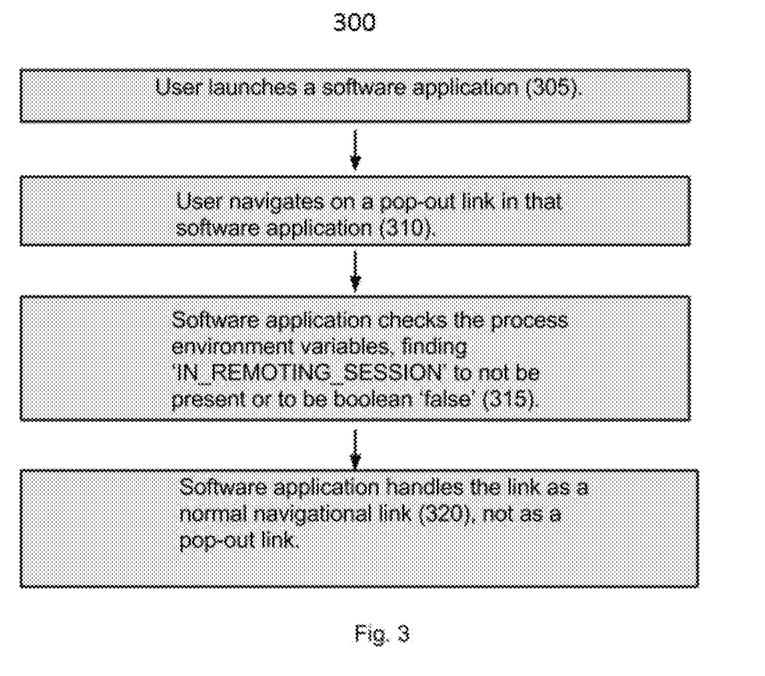
FIG. 3 is a flowchart depicting a use-case scenario where a user, using a local window, navigates a pop-out link and the pop-out link is handled properly due to the fact that an environment variable, in this case 'IN_REMOTING_SESSION', has not been set.

FIG. 3 is a flowchart depicting a use-case scenario where a user, using a local window (not a remote window), navigates a pop-out link and the pop-out link is handled properly because an environment variable, 'IN_REMOTING_SESSION', has not been set or has been set to 'false'. Other functionalities can be performed similarly.

The user proceeds to the desired software application, in this case a web browser 305. In the course of using said program, the user clicks on a navigational link in the application that is a pop-out link 310. The software application examines its process environment variables for the presence of 'IN_REMOTING_SESSION', and either fails to find this environment variable or sees that the environment variable is set to a value that evaluates in a conditional statement to the boolean value 'false' 315. Accordingly, the software application handles the link as a normal navigational link 320.

Setting the environment occurs when a user initiates a remote graphical windowing user session, a remote computer desktop, or a remote graphical application window. By consulting and identifying that the environment variable evaluates to 'true', a functionality is performed differently from the functionality that is performed if the environment variable is 'false'. Similarly, when a user moves the pointing device, after consulting that the environment variable is true, the system can be configured to allocate more memory and/or CPU priority to the graphics operations required by the remote windows. When streaming content, after consulting that the environment variable is 'true', the system can be configured to send the source information to the client and to skip rendering the content on the remoting server.

Figure 4:
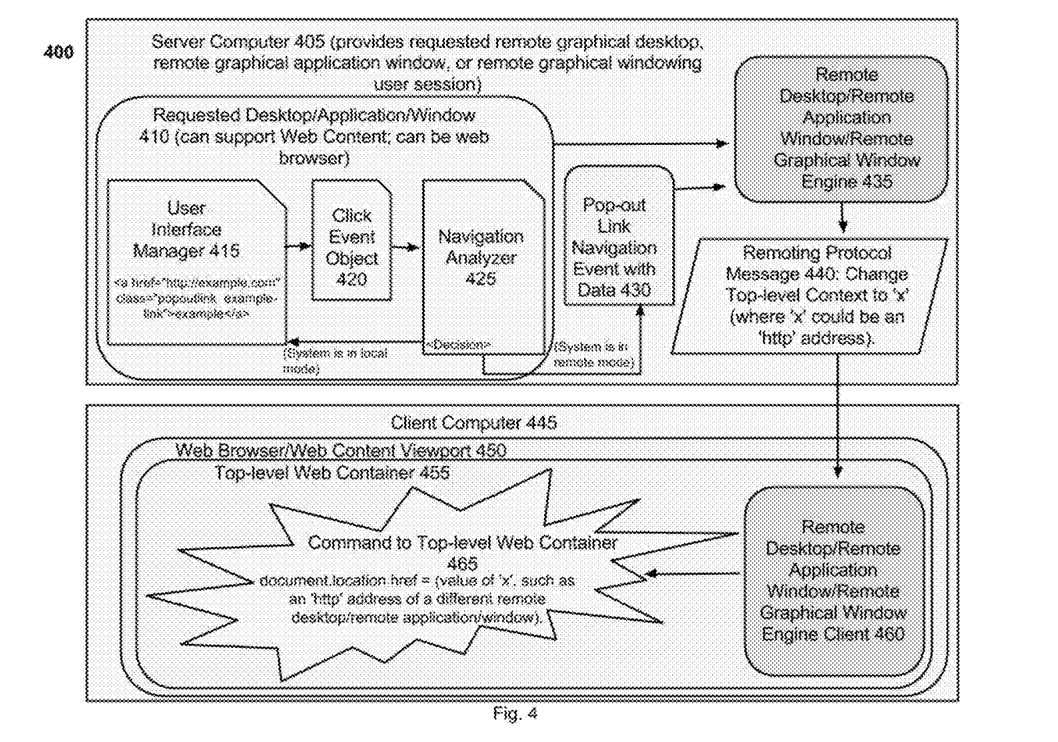
FIG. 4 is a block diagram showing how a system determines, upon navigational action on a pop-out link, if it should direct the user's local web browser to refresh the top-level container that is currently directly displaying the content presented by the remote computer with the new content that the link points to or alternatively, handle the link within the current remoting session.

FIG. 4 is a block diagram showing how navigational action on a pop-out link is evaluated by a Navigation Analyzer 425 that, depending on whether or not the OS on the Server Computer 405 is in local or remote mode, respectively either returns control to the User Interface Manager 415 (including by extension any of its children, such as low-level graphical panels), or directs the user's local web browser to refresh the top-level container that is currently directly displaying the content presented by the remote computer with the new content that the link points to.

When a computer program supporting pop-out links, such as Requested Application 410, encounters a click on a navigation link, it sends the Click Event Object 420 to a custom event handler for navigation links that utilizes the Navigation Analyzer 425 to determine if the navigation link is a pop-out link that needs to be followed by refreshing a Top-level Web Container 455 of the Web Browser/Web Content Viewport 450.

The Navigation Analyzer 425 determines whether or not the Server Computer 405 is in remote or local mode by checking the relevant environment variable as described above. If the Navigation Analyzer 425 determines that the OS of Server Computer 405 is in local mode, it does not send any Pop-out Navigation Event with Data 430. Instead it makes no modifications and takes no further actions except for invoking the current program's standard event handler (not the custom one for handling possible pop-out links under remote mode) for navigational links, which allows the Click Event Object 420 to be handled normally by the User Interface Manager 415 and/or its subcomponents.

If the Navigation Analyzer 425 determines that the OS of Server Computer 405 is in remote mode, then the Navigation Analyzer 425 must detect if the link is a pop-out link. It may do this by checking annotations on the link itself, such as via a parser for the text in the link, or it may, alternatively or in some combination, use some other service, including a networked, local-area-network-based (LAN-based), or Internet-based service, to do so.

If the Navigation Analyzer 425 determines that the OS of Server Computer 405 is in remote mode and that the link is a pop-out link, it will utilize the Pop-out Link Navigation Event with Data 430 (transported by a pop-out link navigation event) to alert the remoting engine (Remote Desktop/Remote Application Window/Remote Graphical Window Engine 435). In the Pop-out Link Navigation Event Data 430, it passes the URL of the pop-out link along with the value of any other HTML attributes such as 'target', to it. The alerting can be done by use of components that, taken individually, are well-known to those skilled in the art. While the specific implementation may vary depending upon the specific computer languages used by these applications and graphical computer desktops, and while it may vary according to the specific application, a basic approach holds across the variations.

In the preferred embodiment, a standard web application client receives a pop-out link navigation directive from the remote computer and directs the top-level user-interface container that currently holds the content served by the remote computer to the resource specified in the navigation directive. The client can be embodied in client software that generally or strictly conforms to the specifications of a web application as defined by the World Wide Web Consortium, that runs on the end user's local computer on a standard web browser or on a web-enabled application, and that is able to execute by using only building blocks made from technologies defined by the World Wide Web Consortium. This is done without plug-ins to the standard web browser or the web part of the web-enabled application. A "standard web browser" or a "standard web view" is equipped to execute a fairly comprehensive suite of program code for delivering web-based software applications, as defined in reasonably up-to-date specifications from the World Wide Web Consortium. "Web-enabled applications" are applications that can host a "standard web view".

The server part of the preferred embodiment would add to its remoting engine, such as one supporting a Virtual Network Computing" ("VNC") server or a Remote Desktop Protocol ("RDP") server, or possibly to its OS, the capability of accepting and acting upon pop-out link messages, including the URL's or URI's from pop-out links. Pop-out link-enabled applications that run on the server machine's OS would be capable of differentiating clicks on pop-out links from clicks on links, and would pass a message to either the OS or directly to the remoting engine that a pop-out link has been clicked, with the URL or URI of the pop-out link contained as data of the message. This kind of message is sometimes referred to in the art as an "event'. Whether or not the pop-out link message would pass through the OS and then to the remoting engine would depend upon the details of the mechanics of the specific type OS on the server itself. In either case, the remoting engine will then transmit the pop-out link navigation command to the client, resulting in the refreshing of Top-level Web Container 455 with the content referred to by the URL or URI of the pop-out navigation link.

The preceding description contains embodiments of the invention and no limitation of the scope is thereby intended.

That which is claimed is:

1. A computer-implemented method comprising:
dynamically setting an environment variable in an operating system process of a current windowing display session hosted by the operating system, wherein the environment variable identifies whether the windowing display session is in remote mode or local mode, upon a request from a remote user to initiate a remote graphical windowing user session, a remote computer desktop, or a remote graphical application window on a remote server, to remote mode;
directing a software application running in the current windowing display session to consult the environment variable to determine if the operating system is being used via a remote window, wherein:
a) if the environment variable evaluates to 'true', when streaming content to a client, send the source information to the client and skip rendering the content on the remoting server;
b) if the environment variable evaluates to 'false', when streaming content to a client, render the content on the remoting server;
changing the value of the environment variable in an operating system process of a current remote graphical windowing user session, remote computer desktop, or remote graphical application window on a remote server hosted by the operating system, when it is no longer desired to run in remote mode.

2. The method of claim 1, wherein the environment variable is a new custom variable.

3. The method of claim 1, wherein the environment variable is a pre-existing variable.

4. The method of claim 1, wherein consulting the environment variable to determine if the operating system is being used via a remote window, occurs upon navigational action on a pop-out link, wherein:
a) if the environment variable evaluates to 'true', treating the link as a pop-out link;
b) if the environment variable evaluates to 'false', treating the link as a standard navigational link.

5. A system for remote windowing comprising at least one processor, the at least one processor configured to cause the system to at least perform:
dynamically setting an environment variable in an operating system process of a current windowing display session hosted by the operating system, wherein the environment variable identifies whether the windowing display session is in remote mode or local mode, upon a request from a remote user to initiate a remote graphical windowing user session, a remote computer desktop, or a remote graphical application window on a remote server, to remote mode;
directing a software application running in the current windowing display session to consult the environment variable to determine if the operating system is being used via a remote window, wherein:
c) if the environment variable evaluates to 'true', when streaming content to a client, send the source information to the client and skip rendering the content on the remoting server;
d) if the environment variable evaluates to 'false', when streaming content to a client, render the content on the remoting server;
changing value of the environment variable in an operating system process of a current remote graphical windowing user session, remote computer desktop, or remote graphical application window on a remote server hosted by the operating system, when it is no longer desired to run in remote mode.

6. The system of claim 5, wherein the environment variable is a new custom variable.

7. The system of claim 5, wherein the environment variable is a pre-existing variable.

8. The system of claim 5, wherein consulting the environment variable to determine if the operating system is being used via a remote window, occurs upon navigational action on a pop-out link wherein:
a) if the environment variable evaluates to 'true', the link is treated as a pop-out link;
b) if the environment variable evaluates to 'false', the link is treated as a standard navigational link.

9. A remote windowing server apparatus comprising:
a remoting engine that:
sets an environment variable in an operating system process of a current windowing display session hosted by the operating system, wherein the environment variable identifies whether the windowing display session is in remote mode or local mode, upon a request from a remote user to initiate a remote graphical windowing user session, a remote computer desktop, or a remote graphical application window on a remote server, to remote mode;
changes the value of the environment variable in an operating system process of a current remote graphical windowing user session, remote computer desktop, or remote graphical application window on a remote server hosted by the operating system, when it is no longer desired to run in remote mode;
a software application running in the current windowing display session that consults the environment variable to determine if the operating system is being used via a remote window, wherein:

a) if the environment variable evaluates to 'true', when streaming content to a client, send the source information to the client and skip rendering the content on the remoting server;
b) if the environment variable evaluates to 'false', when streaming content to a client, render the content on the remoting server.

10. The apparatus of claim 9, wherein the environment variable is a new custom variable.

11. The apparatus of claim 9, wherein the environment variable is a pre-existing variable.

12. The apparatus of claim 9, wherein the software application consulting the environment variable to determine if the operating system is being used via a remote window, does so upon navigational action on a pop-out link, wherein:
a) if the environment variable evaluates to 'true', the software application treats the link as a pop-out link;
b) if the environment variable evaluates to 'false', the software application treats the link as a standard navigational link.

\* \* \* \* \*